(12) United States Patent
Li

(10) Patent No.: US 8,936,704 B1
(45) Date of Patent: Jan. 20, 2015

(54) ELECTROLYTIC HYDROGEN GENERATION WITH ADJUSTABLE OPERATING CAPACITY

(71) Applicant: Haiming Li, Braintree, MA (US)

(72) Inventor: Haiming Li, Braintree, MA (US)

( * ) Notice: Subject to any disclaimer, the term of this patent is extended or adjusted under 35 U.S.C. 154(b) by 0 days.

(21) Appl. No.: 14/508,412

(22) Filed: Oct. 7, 2014

(51) Int. Cl.
*C25B 15/02* (2006.01)
*C25B 1/04* (2006.01)

(52) U.S. Cl.
CPC .. *C25B 15/02* (2013.01); *C25B 1/04* (2013.01)
USPC .................. 204/230.5; 204/229.8; 204/230.3; 205/637

(58) Field of Classification Search
None
See application file for complete search history.

(56) References Cited

U.S. PATENT DOCUMENTS

| 2008/0047502 | A1* | 2/2008 | Morse | 123/3 |
| 2010/0114395 | A1* | 5/2010 | Hinatsu et al. | 700/295 |

* cited by examiner

*Primary Examiner* — Nicholas A Smith

(57) ABSTRACT

Systems and methods for generating hydrogen by electrolysis of water from a volatile power source may facilitate adjusting the operating capacity of an electrolysis stack based on measurements of the electricity output of the power source. In various embodiments, capacity adjustment is achieved by incorporating fewer or more cells of the electrolysis stack into a closed electrical circuit including the incorporated cells in series with the power source.

12 Claims, 4 Drawing Sheets

ELECTROLYTIC HYDROGEN GENERATION WITH ADJUSTABLE OPERATING CAPACITY

DESCRIPTION OF RELATED ART

Hydrogen has long been regarded as a clean alternative fuel source to fossil fuel energy sources. Hydrogen is non-polluting, transportable, storable, more efficient than petrol, and can be converted directly to heat and electricity for both stationary and mobile applications.

Hydrogen can be generated in a number of ways, for example by electrolysis. Electrolysis provides a particular clean hydrogen-generation method, especially, if the electricity is generated from a green energy source such as solar or wind power. Hydrogen generation by water electrolysis with wind or solar power has high growth potential due to the fact that these are renewable sources of energy. However, wind energy and solar energy have inherent disadvantages that prevent them from being effectively and fully utilized in conventional electrolysis systems. Because these power sources are intermittent and non-dispatchable, there can be many periods of inefficiency with either over- or underproduction of energy available for electrolysis. For example, when winds are strong and the power output is higher than the power demands of a traditional electrolysis system, a large portion of the generated power is wasted. Because of this low conversion efficiency, producing hydrogen from water with renewable energy sources is of high cost, currently preventing the widespread use of hydrogen as a fuel source.

Many attempts have been made to improve the efficiency and reduce the cost of hydrogen production by electrolysis. Previous approaches that address the volatility of input power sources generally fall into two categories:

one category involves splitting an electrolysis system into a number of sub-stacks, cells, or plates ("units"), and managing each unit with a control device individually; for example, U.S. Patent Application Publication No. 2011/0155583 describes a hydrogen generation system that includes a number of electrolysis stacks, where the number of operating stacks is constantly controlled by a controlling mechanism. Each stack is turned on/off by a corresponding switch. This inevitably increases the number of controlling devices and the complexity of manufacturing multiple electrolysis units, which in turn increases total cost.

The other category involves regulating the input electricity with current or voltage regulation devices, such as a transformer. For example, U.S. Pat. No. 7,892,407 describes a system in which the efficiency of solar-powered electrolysis of water is increased by matching the voltage generated by photovoltaic modules to the operating voltage of the electrolyzer using a DC-DC converter. This approach does not only require extra cost for the electric regulation devices, but also suffers from the efficiency loss of the electric regulation process. Some prior-art systems use both approaches in combination (see, e.g., U.S. Pat. No. 7,906,007).

Both approaches often lead to increased cost and complexity of the hydrogen-generating system, efficiency losses, and/or maintenance issues in the long term.

SUMMARY

The present application discloses a new approach to controlling a hydrogen generation system powered by the nonstable stream of electricity produced from wind, solar or other volatile sources for hydrogen production. In various embodiments, the hydrogen generation system includes an automatically controlled electrolysis stack with a controlling function that determines what the operating capacity of the electrolysis stack should be at a given moment in order to efficiently use the momentary input power. The hydrogen generation system may include, in addition to the electrolysis stack, a conductive track, a movable electrical contact bridge and an associated driver, a measuring device, and a controller. The electrolysis stack may include a plurality of electrolysis cells electrically connected in series to form an electrically conductive path therethrough. The operating capacity of the stack can be changed by adjusting the number of electrolysis cells within the path that are connected to the power source. More specifically, the controller may, based on input of the measurement of current electricity and/or other operating parameters of the system (e.g., in conjunction with the preset operating electricity requirement of an electrolysis stack), determine the desired capacity of the operating electrolysis stack (i.e., the desired number of electrolysis cells), and send a corresponding control signal to the driver. The driver may then, based on the signal from the controller, control the position of the movable contact bridge on the conductive track. The contact bridge, by stopping at different positions in accordance with the commands received from the controller, can limit the electricity loop of the electrolysis stack to the desired operating capacity.

Thus, various embodiments disclosed herein provide an efficient method for increasing and decreasing the capacity of an electrolysis stack, allowing a hydrogen generation system to be operated at the desired efficiency with fluctuating electricity in different format.

Furthermore, compared with prior-art systems, the approach disclosed herein reduces the number of sensors, controllers, and/or switches used to control a plurality of electrolysis units, and thereby reduces the technical complexity of the hydrogen generation system. Advantageously, this may, in turn, reduce the cost of hydrogen production and improve the popularity of hydrogen in replacing fossil fuels as a fuel energy source.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
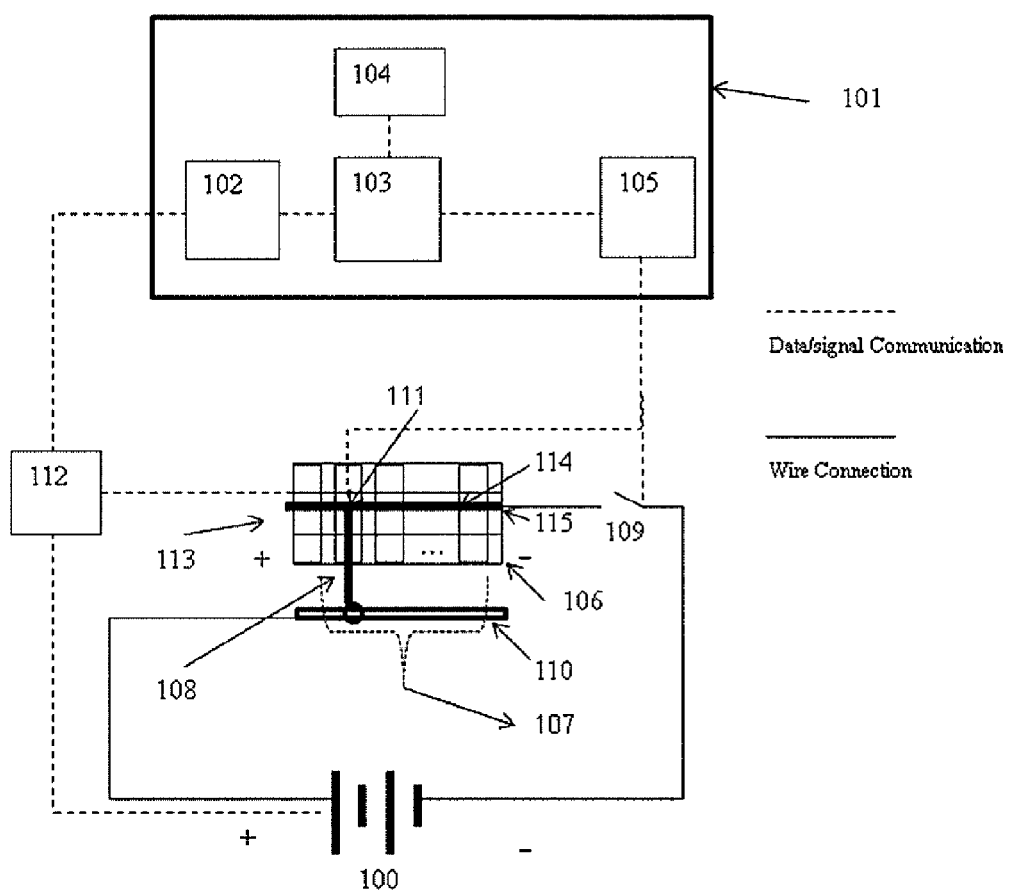
FIG. 1 schematically shows an example electrical structure of a hydrogen generation system in accordance with various embodiments.

The present application describes a hydrogen generation system with an automatic control capability, and more particularly a high-efficiency electrolyzes that adjusts to volatility and changes of the power source, thus efficiently converting a volatile energy source into hydrogen fuel energy.

Various embodiments are described herein in detail. It is to be understood, however, that features described with reference to one or more embodiments need not, in general, be present in all embodiments. Accordingly, the described example embodiment is to be considered illustrative and not limiting.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale; some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the design disclosed herein apply to the control of a hydrogen generator powered by any suitable sources; for the sake of clarity, the examples are given based on either solar power or wind-generated power. Furthermore, it is contemplated and intended that the control systems and methods disclosed herein may be used in combination with any type of electrolysis technology. Technologies for hydrogen generation through water electrolysis currently available and well-known to those of ordinary skill in the art include proton exchange membrane (PEM) technology and alkaline technology. PEM electrolysis is the electrolysis of water in a cell equipped with a solid polymer electrolyte (SPE) that is responsible for the conduction of protons, separation of product gases, and electrical insulation of the electrodes. Alkaline electrolysis uses alkaline as the electrolyte. As will be readily appreciated, however, the embodiments described herein are not limited to these two electrolysis technologies, but are amenable to use in conjunction with other electrolysis technologies as well, and a person of ordinary skill in the art will know the necessary modifications and changes to be made.

FIG. 1 conceptually illustrates an example embodiment of a hydrogen generation system in accordance herewith. The system includes a power source 100, a controller 101 (which may include, e.g., an input interface 102, a CPU 103, a data storage device 104, and an output interface 105), an electrolysis stack 106 (which generally includes a plurality of electrolysis cells 107), a movable contact bridge 108, a conductive track 110, and a measuring device 112. The cells 107 of the stack 106 are electrically connected in series so as to form an electrical conductive path 114 through the stack. One end 115 of this path is electrically connected (or electrically connectable via a switch 109) to one terminal of the power source 100 (e.g., as shown, the negative terminal). The other end 113 of the electrically conductive path 114 may be an open end. Thus, the stack 106 by itself does generally not form a closed circuit with the power source 100. Rather, the conductive track 110 and the contact bridge 108 serve to close the circuit. In particular, as illustrated, the conductive track 110 is electrically connected to the second terminal of the power source (e.g., the positive terminal), and the movable contact bridge 108 establishes an electrical connection between a point on the conductive path 114 and the conductive track 110. In this way, electricity will go into one end (115) of the stack and come out from the contact bridge 108, not from the other end (113) of the stack 106 (unless, of course, the contact bridge 108 happens to connect to the conductive path 114 at the end 113). The result is a circuit including the power source 100, a number of the electrolysis cells 107, the contact bridge 108, and the conductive track 110 in a serial configuration (Note that the designation of positive and negative terminals of the power source 100 is for illustration purposes only. The positive and negative terminals of the power source can, in practice, be switched without affecting the principles of operation disclosed herein.)

The point 111 along the conductive path 114 at which the contact bridge 108 contacts the conductive path 114 is variable. In some embodiments, the contact point 111 between the contact bridge 108 and the conductive path 114 can be set at any position between the two ends 115, 113 of the conductive path 114, and thus include any number of electrolysis cells 107 of the stack 106 (e.g., zero cells, one cell, or multiple cells up to a maximum number of cells corresponding to the number of cells in the stack) within the circuit. For example, as shown, the contact bridge may be connected to the conductive path 114 three cells 107 away from the open end 113 of the conductive path 114, thereby excluding these three cells from the circuit while including all other cells. In some embodiments, movement of the contact bridge 108 is limited to enforce certain constraints on the number of cells 107 included in the circuit, e.g., to ensure that at least one cell 107 is part of the circuit. In general, only the portion of stack 106 between the negative end 115 and the contact bridge 108 is included in the electrical circuit at any given time, while the remaining portion of stack 106 has no electricity running Therethrough. Thus, by positioning the contact bridge, the system can turn selected portions of the stack 106 on or of The position of the contact bridge 108, and thus the operating capacity of the hydrogen generation system, is controlled by the controller 101. For instance, in some embodiments, the output interface 105 can send signals to control the movable contact bridge 108 in order to turn the operating capacity of the system up or down. Output interface 105 can also send a signal to the switch 109 to power off the stack 106 completely when necessary.

In operation, the measuring device 112 measures the electrical output (and optionally one or more other operating parameters) of the external power source 100 and/or one or more operating parameters of the electrolysis stack 106. The electrical output of the power source 100 may be measured, for example, in terms of an electrical voltage or current. Measured operating parameters of the stack 106 may include, for example, the pressure, temperature, and/or liquid level inside the stack 106, the output flow rate of hydrogen gas, etc. The measuring device 112 may (but need not) include different sensors for measuring two or more different parameters of the system (including a parameter indicative of the electrical output of the power source). Further, the measuring device 112 may include processing functionality to process the signal(s) received from the sensor(s). Although illustrated as a single box, different physical components jointly constituting the measuring device 112 may be physically distributed and need not be contained in a single casing or other physical enclosure, as a person of ordinary skill in the art will recognize. In various embodiments, the measuring device 112 keeps measuring the electrical output and/or other parameters throughout the operation of the electrolysis stack, e.g., by acquiring sensor signals at regular time intervals (e.g., once a second, once a minute, or at another suitable interval) or at irregular intervals, depending on the needs of the particular application context.

In some embodiments, the measuring device 112 sends electrical signals with the measured information (e.g., raw signals or pre-processed signals indicative of the output of the power source 100 and/or other operating parameters) to the input interface 102 of the controller 101. Upon receipt, the input interface 102 may translate the electronic signal(s) to a logic signal, which is then transferred to the CPU 103. The CPU 103 then processes the signal, e.g., by performing a calculation based on one or more programs stored in storage device 104, to determine the desirable operating capacity of the electrolysis stacks 106 (i.e., to determine how many of the cells 107 should be operating) under the measured conditions (in particular, given the presently available power provided by power source 100). Based on the computed desirable operating capacity, the CPU 103 may further calculate the position to which the movable contact bridge 108 should move, and generate and send one or more commands indicative of that position to the output interface 105. The output interface 105 may convert these commands to electrical signals to control the opening/closing of switch 109 and/or the movement of the movable contact bridge 108. As will be readily understood, various modifications of the controller 101 described above are possible. For example, the computational functionality for determining the desirable operating capacity and the corresponding position of the contact bridge 108 may alternatively be provided entirely in hardware (e.g., as hardwired circuitry rather than with a processor and memory containing software instructions). Instead of using a group of switches/sensors to control each one of a group of electrolysis cells/stacks individually to adjust the operation capacity, like U.S. Patent Application Publication No. 2011/0155583 does, various embodiments hereof use only a single electrolysis stack 106 and one set of switch 109, controller 101, and measuring device 112 to be able to adjust the hydrogen generation capacity from 0% to 100%.

Figure 2:
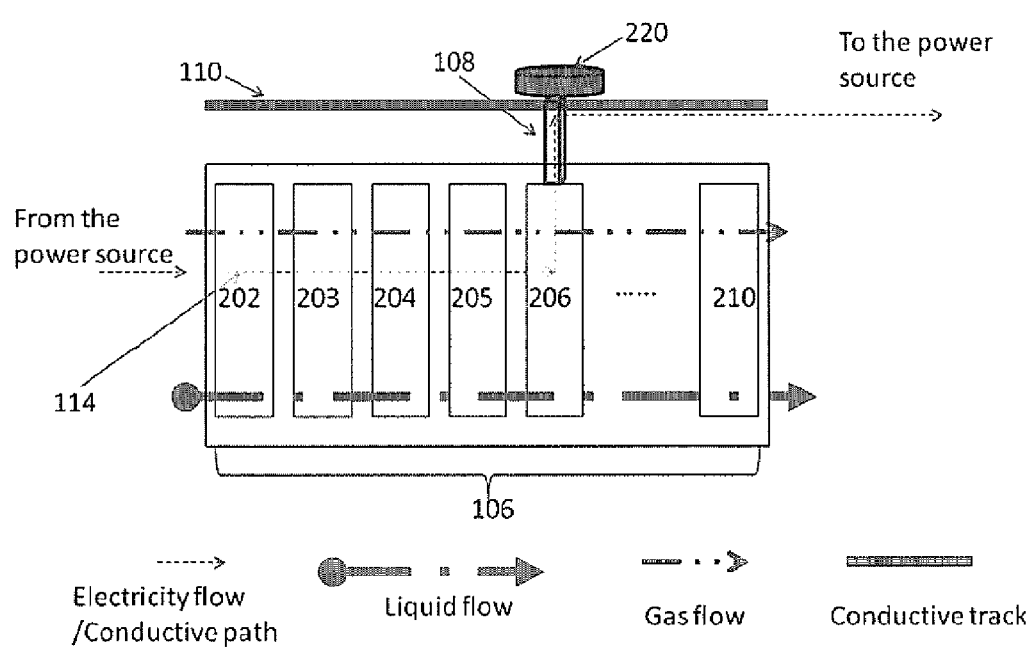
FIG. 2 schematically shows an example structure of an electrolysis stack comprising a plurality of electrolysis cells in accordance with various embodiments.
Figure 3A:
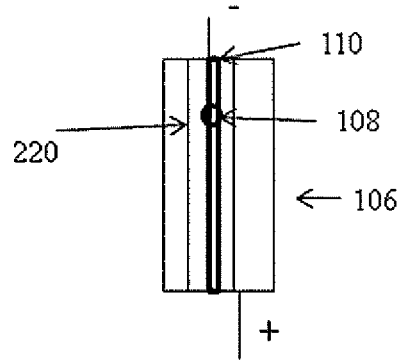
FIGS. 3A and 3B schematically show top and front views, respectively, of a conductive track, movable contact bridge, and electrolysis stack in accordance with various embodiments.
Figure 3B:
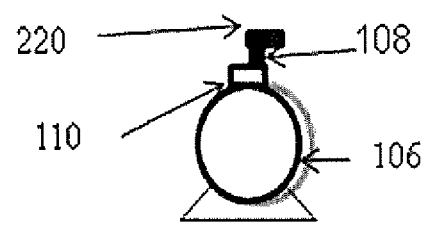

FIG. 2 provides a side view of the electrolysis stack 106, contact bridge 108, and conductive track 110, illustrating their relative geometric arrangement (among other things). As shown, the conductive track 110 and the contact bridge 108 may be installed on top of the electrolysis stack 106, the conductive track 110 being arranged substantially parallel to the stack 106. This arrangement becomes even clearer when FIG. 2 is viewed in conjunction with FIGS. 3A and 3B, which provide top and front views, respectively, of the electrolysis stack 106 and the conductive track 110 and contact bridge 108 mounted thereon. The conductive track 110 may have two roles: in addition to electrically coupling the electrolysis cells 107 to the second (positive) terminal of the power source 100, it may serve to mechanically support the contact bridge 108 and guide its movement. For example, the conductive track may be made of metal and shaped like a rail in which the upper end of the contact bridge is seated; suitable shapes and configurations will be readily apparent to those of ordinary skill in the art. The design may be compact and easy to manufacture.

As shown in FIG. 2, the electrolysis stack 106 may contain M electrolysis slots/cells (including, e.g., depicted cells 202, 203, 204, 205, 206, . . . 210), connected in series. In some embodiments, the cells are directly adjacent to each other, avoiding the need for pipelines or cables between them; this arrangement provides an economical and practical way to manufacture a single electrolysis stack. Each electrolysis slot/cell may operate under 1.6-2.3 Volt DC electricity; accordingly, the electrolysis stack 106 as a complete unit operates preferably under about 2*M Volt DC electricity, if all the electrolysis cells are operating. Depending on the position of the contact bridge 108, the operating cells may change from 1 to M, and the operational voltage for the electrolysis stack 106 may change from 2 Volt to 2*M Volts, without using any transformer or similar electrical devices. In this way, the present application changes the operational voltage of the electrolysis stack 106 to match the input voltage from the power source 100, while many other inventions, such as that described in U.S. Pat. No. 7,906,007, do the opposite, i.e., change the input voltage provided by the power source to match the operational voltage of the electrolysis stack. (The foregoing is not to be understood as excluding systems and methods that involve adjusting the voltage of the power source in addition to adjusting the operating capacity of the electrolysis stack 106.) As laboratory research has shown, the electrochemical efficiency of a given electrolysis cell or stack tends to become higher for lower electrical currents (everything else staying the same). Various embodiments take advantage of this insight by tweaking the desired operating voltage for each electrolysis cell between 1.6 V and 2.3 V to ensure low operating amperage at any given time. The 1.6V~2.3V range may vary depending on the electrode materials and electrolyte.

In various embodiments, the contact bridge 108 is driven by a driver device 220 that causes its movement along the conductive track 110 and stops at a certain position designated by the controller 101. The driver device 220 may be or include, for example, a step motor, an electric pulley, a rail slip wheel, or any other device that can move to a designated position following a command signal. The driver device 220 is controlled with signals received from the controller 101. In some embodiments, if the CPU 103 determines that the capacity of the electrolysis stack 106 should be increased, a signal from output interface 105 makes sure that switch 109 is closed, i.e., connects the stack 106 to the power source 100, and further, a signal from output interface 105 commands the driver device 220 to move the contact bridge 108 to a position where more cells 107 of the electrolysis stack 106 are included in the electrical circuit. If the CPU 103 determines that the available real-time electricity is not sufficient for the electrolysis stack 106 to function at its currently set capacity, a signal from the output interface 105 will drive the driver device 220 reversely to exclude some cells 107 of the electrolysis stack 106 from the electrical circuit.

The input interface 102 may also receive pre-set settings about the system, for example, the maximum voltage or currents for the system, the total number of electrolysis cells inside the stack 106 (i.e., the maximum number of cells 107 available for this stack), calculation methods for the desired operating parameter for the electrolysis stack, the sequential order to increase or decrease the working capacity of the electrolysis stack, etc.

Advantageously, various embodiments described herein facilitate capacity control of an electrolysis system using a single controller that adjusts the operating capacity of and within a single electrolysis stack. This reduces complexity (e.g., in terms of the number of system components) and manufacturing cost of the overall system, compared with various conventional systems that use multiple controllers to control each of multiple electrolysis units (such as multiple stacks, sub-stacks, or cells) separately to achieve adjustable capacity. The conventional systems, in order to allow each unit to be turned on or off separately, also generally require separate electrical cable connections and gas/liquid pipelines for each unit. By contrast, for various embodiments hereof, it suffices to connect one set of cables and pipelines into the stack, contributing to lower manufacturing cost. In various embodiments, the compact design in accordance herewith also results in a smaller exterior surface, reducing heat losses and thus rendering it more energy efficient to maintain the high temperature range (normally about 70° C.~90° C.) generally used to sustain efficient electrolysis.

Figure 4:
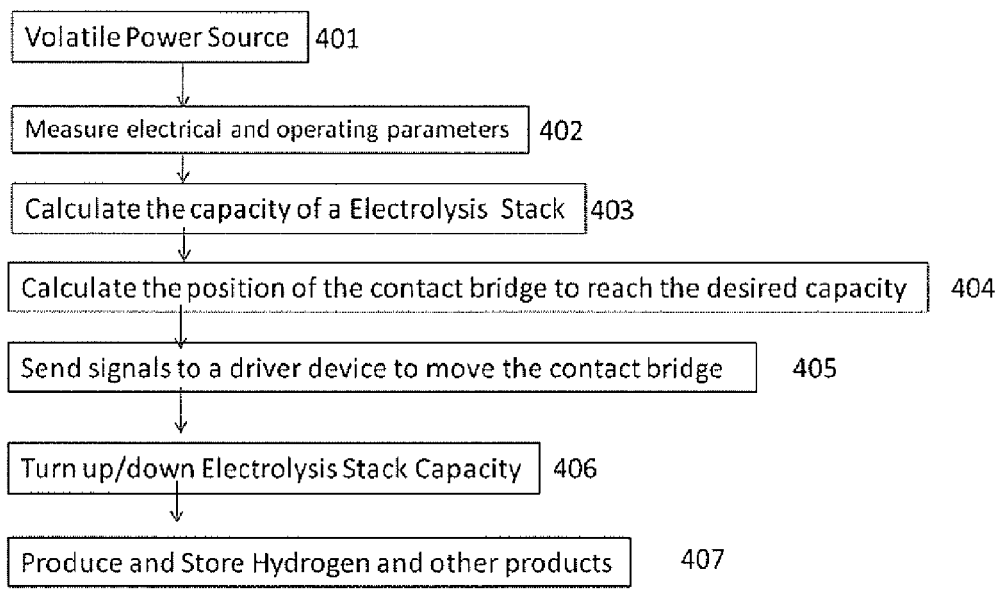
FIG. 4 schematically shows an example flow chart illustrating a hydrogen-generation method including capacity adjustments in accordance with various embodiments.

FIG. 4 illustrates an example method for employing the electrolysis system described above. The method involves generating power (401), typically with a volatile power source (e.g., utilizing solar or wind power), to drive the electrolysis. Further, one or more electrical parameters (e.g., voltage, current, and/or power) of the power source, and optionally other parameters of the system, are measured, and the results of the measurements are sent to the controller 101 (402). The controller 101 takes the parameter(s) of the power source 100 and/or of the electrolysis stack 106, and calculates the desired operating capacity of the electrolysis stack 106 according to either the pre-settings or instant measurements (403). The desired position of contact bridge 108 is calculated based on the desired operating capacity (404); the controller 101 sends a signal indicating this position to a driver device 220 (405). The capacity of the electrolysis is then increased or decreased by using the driver device 220 to move the contact bridge 108 to the desired position (406). Electrolysis then proceeds at the adjusted capacity to generate hydrogen and/or other electrolysis products, and the generated hydrogen gas and other products are collected and stored for later use (407).

As will be recognized by those skilled in the art, the innovative concepts described in the present application can be modified and varied over a large range of applications. Accordingly, the scope of the claimed subject matter shall not be taken as limited by any of the specific example embodiments described. It will be appreciated that various alternatives, modifications, and variations are possible without departing from the scope of the present disclosure.

Further, none of the description in the present application should be read as implying that any particular element, step, or function is an essential element which must be included in the claim scope. Moreover, none of the claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned

What is claimed is:

1. A hydrogen generation system, comprising:
    an electrolysis stack comprising a plurality of electrolysis cells electrically connected in series to form an electrically conductive path having first and second ends, a first end being electrically connected to a first terminal of a power source;
    a conductive track electrically connected to a second terminal of the power source;
    a movable electrical contact bridge for electrically connecting the conductive track with a variable point along the electrically conductive path to thereby form an electrical circuit including a variable number of electrolysis cells in series with the power source;
    a driver device to drive the contact bridge along the conductive track;
    a measuring device measuring an electrical output of the power source; and
    a controller for determining the number of electrolysis cells to be operated based at least in part on the measured electrical output of the power source, and to cause movement of the driver device to drive the contact bridge to a point hi accordance with the determined number of cells, to thereby form an electrical circuit including the determined number of electrolysis cells in series with the power source.

2. The hydrogen generation system of claim 1, wherein each of the electrolysis cells is operational as part of the stack only if it is included in the electrical circuit.

3. The hydrogen generation system of claim 1, wherein said measuring device is configured to sample at least one of a voltage signal or an electrical current signal from the power source and to send the at least one signal to the controller.

4. The hydrogen generation system of claim 1, wherein the controller is configured to determine the number of electrolysis cells to be operated at least in part based on real-time data from the measuring device.

5. The hydrogen generation system of claim 4, wherein the controller determines the number of electrolysis cells to be operated further based on forecast data.

6. The hydrogen generation system of claim 1, wherein the driver device comprises a step motor.

7. The hydrogen generation system of claim 6, wherein the controller is configured to compute, based upon the measured electrical output, a target position of the contact bridge, and to send a command indicative of the target position to the step motor.

8. A method for generating hydrogen from a volatile power source, comprising the actions of:
    measuring an electrical output of the power source;
    calculating an operating capacity of an electrolysis stack based at least in part on the measured electrical output, the desired operating capacity corresponding to a specified number of electrolysis cells to be included in the electrolysis stack;
    using a hydrogen generation system comprising (i) a plurality of electrolysis cells electrically connected in series via an electrically conductive path having a first end electrically connected to a first terminal of the power source, (ii) a conductive track electrically connected to a second terminal of the power source, and (iii) an electrical contact bridge movable along the conductive path and the conductive track and configured to electrically connect a variable point along the conductive path with the conductive track, moving the electrical contact bridge to a point along the conductive path that is separated from the first end of the conductive path by the specified number of electrolysis cells, to thereby from an electrolysis stack including the specified number of electrolysis cells in series with the power source.

9. The method of claim 8, wherein the electrical output comprises at least one of an electrical current or a voltage of the power source.

10. The method of claim 8, further comprising measuring an operating parameter of the hydrogen generation system and calculating the desired operating capacity based further on the measured operating parameter.

11. The method of claim 10, wherein the operating parameter comprises at least one of a gas pressure, a temperature, an electrolyte level, or a water level in the electrolysis stack.

12. The method of claim 8, wherein moving the electrical contact bridge comprises instructing a driver device to drive the contact bridge to the point along the conductive path that is separated from the first end by the specified number of electrolysis cells.

* * * * *